US008667408B2

(12) United States Patent
Peterson et al.

(10) Patent No.: US 8,667,408 B2
(45) Date of Patent: Mar. 4, 2014

(54) DO-IT-YOURSELF BADGE AND METHOD OF MAKING SAME

(75) Inventors: James Peterson, Manitowoc, WI (US); Brian Powell, Two Rivers, WI (US)

(73) Assignee: Contemporary, Inc., Manitowoc, WI (US)

( * ) Notice: Subject to any disclaimer, the term of this patent is extended or adjusted under 35 U.S.C. 154(b) by 421 days.

(21) Appl. No.: 12/718,827

(22) Filed: Mar. 5, 2010

(65) Prior Publication Data

US 2010/0223567 A1 Sep. 2, 2010

Related U.S. Application Data

(63) Continuation-in-part of application No. 10/252,240, filed on Sep. 23, 2002, now abandoned.

(60) Provisional application No. 60/324,113, filed on Sep. 21, 2001.

(51) Int. Cl.
*G06F 3/048* (2013.01)

(52) U.S. Cl.
USPC ........... 715/765; 715/780; 715/810; 715/838; 715/843; 715/221; 715/223; 715/224; 715/225; 715/226

(58) Field of Classification Search
USPC .......................... 715/221, 223, 224, 225, 226
See application file for complete search history.

(56) References Cited

U.S. PATENT DOCUMENTS

| | | | |
|---|---|---|---|
| 584,770 | A | 6/1897 | Datz |
| 1,483,139 | A | 2/1924 | Weed |
| 2,012,420 | A | 8/1935 | Day |
| 2,213,449 | A | 9/1940 | Mungen |
| 2,232,060 | A | 2/1941 | Foster |
| 2,341,467 | A | 2/1944 | Nedell |
| 2,411,987 | A | 12/1946 | D'Antonio |
| 2,877,578 | A | 3/1959 | Klitzner |
| 3,605,300 | A | 9/1971 | Moore |
| 3,642,552 | A | 2/1972 | Sibley |
| 4,040,194 | A | 8/1977 | Penton et al. |
| 4,236,331 | A | 12/1980 | Mattson |
| 4,459,772 | A | 7/1984 | Kanzelberger |
| 4,509,277 | A | 4/1985 | Bolton |
| 4,716,052 | A | 12/1987 | Waugh et al. |
| 4,718,784 | A | 1/1988 | Drisko |

(Continued)

FOREIGN PATENT DOCUMENTS

| | | |
|---|---|---|
| FR | 2694483 | 2/1994 |

OTHER PUBLICATIONS

CardFive Vision Software Manual, dated 2008, (Cardfive).*

(Continued)

*Primary Examiner* — William Bashore
*Assistant Examiner* — Nathan Shrewsbury
(74) *Attorney, Agent, or Firm* — Michael Best & Friedrich LLP

(57) ABSTRACT

A system for generating customized badges. The system includes a computer, a printer coupled to the computer, a display coupled to the computer, and a computer readable medium. The computer readable medium includes instructions for opening a badge profile, providing a data entry screen based on the profile, receiving data in the data entry screen, and printing customized badges on the printer based on the received data. The badge profile defines a size, type, and location of data to be printed on the customized badges.

21 Claims, 9 Drawing Sheets

(56) References Cited

U.S. PATENT DOCUMENTS

| | | | | |
|---|---|---|---|---|
| 4,869,004 | A | 9/1989 | Maloney | |
| 4,946,532 | A | 8/1990 | Freeman | |
| 5,191,682 | A | 3/1993 | Davis-Reardon et al. | |
| 5,210,966 | A | 5/1993 | Fuehrer | |
| 5,212,899 | A | 5/1993 | Fandreyer | |
| 5,269,083 | A | 12/1993 | Vampatella et al. | |
| 5,269,485 | A | 12/1993 | Dwinell et al. | |
| 5,283,966 | A | 2/1994 | Rader et al. | |
| 5,305,538 | A | 4/1994 | Kanzelberger | |
| 5,369,899 | A | 12/1994 | Reeves | |
| 5,398,435 | A | 3/1995 | Kanzelberger | |
| 5,406,726 | A | 4/1995 | Fan | |
| 5,410,642 | A * | 4/1995 | Hakamatsuka et al. | 358/1.14 |
| 5,410,827 | A | 5/1995 | Smith | |
| 5,413,383 | A | 5/1995 | Laurash et al. | |
| 5,505,494 | A * | 4/1996 | Belluci et al. | 283/75 |
| 5,555,660 | A | 9/1996 | Whitehouse et al. | |
| 5,622,758 | A | 4/1997 | Hollis et al. | |
| 5,635,012 | A * | 6/1997 | Belluci et al. | 156/277 |
| 5,647,099 | A | 7/1997 | Cohen | |
| 5,653,472 | A | 8/1997 | Huddleston et al. | |
| 5,719,828 | A | 2/1998 | Haas et al. | |
| 5,740,557 | A | 4/1998 | Reid et al. | |
| 5,770,289 | A | 6/1998 | Tracy | |
| 5,771,071 | A * | 6/1998 | Bradley et al. | 348/335 |
| 5,787,451 | A | 7/1998 | Mogilevsky | |
| 5,828,461 | A * | 10/1998 | Kubo et al. | 358/296 |
| 5,967,675 | A | 10/1999 | Hastings et al. | |
| 5,974,230 | A | 10/1999 | Jenkins | |
| 6,013,154 | A | 1/2000 | Thomas-Cote | |
| 6,034,785 | A * | 3/2000 | Itoh | 358/1.18 |
| 6,068,716 | A | 5/2000 | Higgins | |
| 6,095,567 | A | 8/2000 | Buell | |
| 6,136,130 | A | 10/2000 | Tataryan et al. | |
| 6,159,570 | A | 12/2000 | Ulrich et al. | |
| 6,173,514 | B1 | 1/2001 | Peterson | |
| 6,174,402 | B1 | 1/2001 | Nakano et al. | |
| 6,196,593 | B1 | 3/2001 | Petrick et al. | |
| 6,197,396 | B1 | 3/2001 | Haas et al. | |
| 6,254,952 | B1 | 7/2001 | Fox et al. | |
| 6,294,237 | B1 | 9/2001 | Popat | |
| 6,318,757 | B1 | 11/2001 | Ritchie et al. | |
| 6,461,707 | B1 | 10/2002 | Scholz et al. | |
| 6,484,424 | B1 | 11/2002 | Peterson | |
| 6,538,765 | B1 | 3/2003 | Ikedo | |
| 6,585,845 | B1 | 7/2003 | Peterson | |
| 6,594,871 | B2 | 7/2003 | Hoffman | |
| 6,632,250 | B1 * | 10/2003 | Lynch et al. | 715/210 |
| RE38,295 | E * | 11/2003 | Kobayashi et al. | 235/449 |
| 6,726,252 | B1 | 4/2004 | Chaikel et al. | |
| 6,811,840 | B1 | 11/2004 | Cross | |
| 6,885,478 | B1 * | 4/2005 | Salgado et al. | 358/449 |
| 6,891,555 | B2 * | 5/2005 | Minowa et al. | 347/171 |
| 7,355,740 | B2 * | 4/2008 | Okuyama et al. | 358/1.17 |
| 7,946,490 | B2 * | 5/2011 | Elgar et al. | 235/462.01 |
| 2001/0024590 | A1 * | 9/2001 | Woodman et al. | 400/613 |
| 2001/0045037 | A1 | 11/2001 | Bank et al. | |
| 2002/0026538 | A1 * | 2/2002 | Takeo et al. | 710/5 |
| 2002/0097448 | A1 * | 7/2002 | Smith | 358/451 |
| 2002/0181022 | A1 * | 12/2002 | Tokashiki | 358/1.18 |
| 2003/0023627 | A1 | 1/2003 | Kerr | |
| 2003/0041102 | A1 * | 2/2003 | Simpson et al. | 709/203 |
| 2005/0022118 | A1 * | 1/2005 | Wefers et al. | 715/513 |
| 2009/0327466 | A1 * | 12/2009 | Lopez et al. | 709/223 |

OTHER PUBLICATIONS

Screen captures taken from actual functioning of the Cardfive program of (2005) and a video of the functioning of the CardFive Vision Software interface Posted to http://www.youtube.com/watch?v=Jsq4hviip8Y&feature=results_video&playnext=1&list=PLCBB60CF9EF34F6C6, as of Jun. 30, 2009.*

Electronic Comparison of U.S. Appl. No. 10/252,240 and U.S. Appl. No. 12/718,827 identifying new material in Continuation in Part.*

John P. Reid, Computer Labels; Antiques Computer Column, Nov. 1994. Available at <http://www.maineantiquedigest.com/articles/comp1194.htm>.

The Cawley Company, "Badge Printer Version 1.2 User's Guide" (Available at least as early as Mar. 2000).

The Cawley Company, "Badge Printer Version 1.2 Installation Guide" (Available at least as early as Mar. 2000).

* cited by examiner

DO-IT-YOURSELF BADGE AND METHOD OF MAKING SAME

RELATED APPLICATIONS

The present application is a continuation-in-part of co-pending U.S. patent application Ser. No. 10/252,240, filed Sep. 23, 2002, which claims the benefit of prior filed U.S. Provisional Patent Application No. 60/324,113, filed Sep. 21, 2001; the entire contents of all of which are hereby incorporated by reference.

FIELD OF THE INVENTION

This invention relates to a do-it-yourself name badge, and the like, and a method of making the badge, especially with the aid of a personal computer, digital cameras, and the like.

BACKGROUND

For convenience of expression, the term "badge" is used hereinafter to identify generically all similar devices, such as badges, trophies, business cards, awards, ID card, luggage tags, signs, key ring tags, and the like. The terms "graphics" or "graphic material," as used herein, includes text, artwork or both.

For an application and a few patents owned by the assignee of this invention that show other nameplates, reference may be made to U.S. patent application Ser. No. 09/507,310, filed Feb. 18, 2000, and to U.S. Pat. Nos. 3,940,864; 4,047,996; 4,267,224; 4,125,655; 4,459,772; 4,497,248 and 5,305,538. Some of these patents disclose a polished metal backing plate with graphic material adhered thereto, which gives an appearance of fine jewelry. In some of these patents, the graphic material is covered with a pressure-sensitive tape in order to give an appearance of graphics sealed in plastic. However, these patents do not make full use of modern aids, such as, e.g., personal computers or digital cameras, which allow the creation of cost-effective, professional looking badges as they are needed.

Two areas where these badges may be improved to provide a greater variety are (1) the source of graphics (e.g. use of a personal computer) and (2) the contour of plastic covering the graphic on the nameplate. Some of the graphics used heretofore have required custom printing in a factory which, in turn, requires a fairly long period of time between ordering and receiving the printed label. The ability to print the graphic on the user's own personal computer greatly shortens the lead time required to obtain a badge.

Another approach used in the past enables the user to print his own label by employing a small commercially available printer, but there were limitations on the versatility of the printer, which sometimes limited creativity.

Today, personal computers have the ability to make many unique graphical presentations. Also, computer controlled printers have many capabilities which are unmatched by the simple printers used heretofore. For example, modern computer printers, used with or without digital cameras, may create pictorial images, use combinations of type fonts, and the like. Also, they provide color printing, digital imaging, etc. Therefore, within reason, a person may be able to personalize badges in a creative and consistent manner with the help of a computer and its sophisticated printers.

The invention provides a do-it-yourself name badge, which can use any of the textual and graphical capabilities of the personal computers and still retain the "look" of fine jewelry.

In addition, the invention provides customized software programs that match text with badge requirements.

The invention also provides name badges which may be given a more elegant appearance by providing a surface contour for the plastic covering the graphic material.

SUMMARY

In one embodiment, the invention provides a system for generating customized badges. The system includes a computer, a printer coupled to the computer, a display coupled to the computer, and a computer readable medium. The computer readable medium includes instructions for opening a badge profile, providing a data entry screen based on the profile, receiving data in the data entry screen, and printing customized badges on the printer based on the received data. The badge profile defines a size, type, and location of data to be printed on the customized badges.

In another embodiment the invention provides a method of generating customized badges using a computer, display, and printer. The method includes the acts of providing to the computer one or more profiles on a computer readable medium, loading one of the one or more profiles, generating a data entry screen on the display based on the loaded profile, receiving textual data in the one or more text fields, indicating on the display when the textual data is invalid, formatting, by the computer, the data based on the loaded profile, and printing the formatted data on the printer. The loaded profile defines a size, type, and location of data to be printed on the customized badges, and the data entry screen includes one or more text fields for entering textual data.

In keeping with an aspect of the invention, a customized software program provides one or more profiles that define and print layouts, which set the stage for a badge design. Each profile may provide a number (such as 1-4) of lines of text, along with a window for special items. Perhaps this may envision a person's name on one line and his title on the next line, and possibly, the name of a company may appear on a third line. A frame may surround a window area where a picture or logo may be placed. Those skilled in the art will readily perceive other features on the layout. The software makes it easy to enter information and print on clear label stock. Means are provided to insure and verify that the text will fit on the badge. A polyurethane or other clear plastic cover can be adhered to this printed label and this assembly may be attached to a badge plate and carrier.

The badge may be further customized by being cut to special shapes after printing as described in my U.S. application Ser. No. 09/570,310 and by covering the graphics by a contoured plastic plate or dome.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

FIGS. 1 to 5 show an embodiment of a software program for generating custom badges. The embodiment of software shown is designed to execute on a personal computer running the Microsoft® Windows® operating system. Other embodiments of the software operate on other processing platforms (e.g., Apple®). The software is supplied to the computer on a computer readable medium (e.g., a CD/ROM, a disk, a flash drive, etc.) or can be loaded from a remote site (e.g., via the Internet). The software program is loaded in the computer, and stored in memory (e.g., RAM, EEPROM, hard drive, flash memory, etc.). The software is then executed by the computer's processor.

Badges can be created on paper (e.g., card stock) or on labels that are attached to badge hardware as described below. The program enables a user to generate and print customized badges. The program uses profile files to define the content and layout of the badges. The content includes text fields and image fields (e.g., quantity and type of each). The layout includes the positioning and size of the fields as well as the font of the text fields on the badges. The profile files are provided by the manufacturer or can be created by a user via a profile creation program. A user inputs data (e.g., name, department, etc.) into the program for a plurality of badges based on a chosen profile. The entered data can be saved, merged, or exported to memory (e.g., a hard drive). The data then can be printed to create custom badges.

Figure 1:
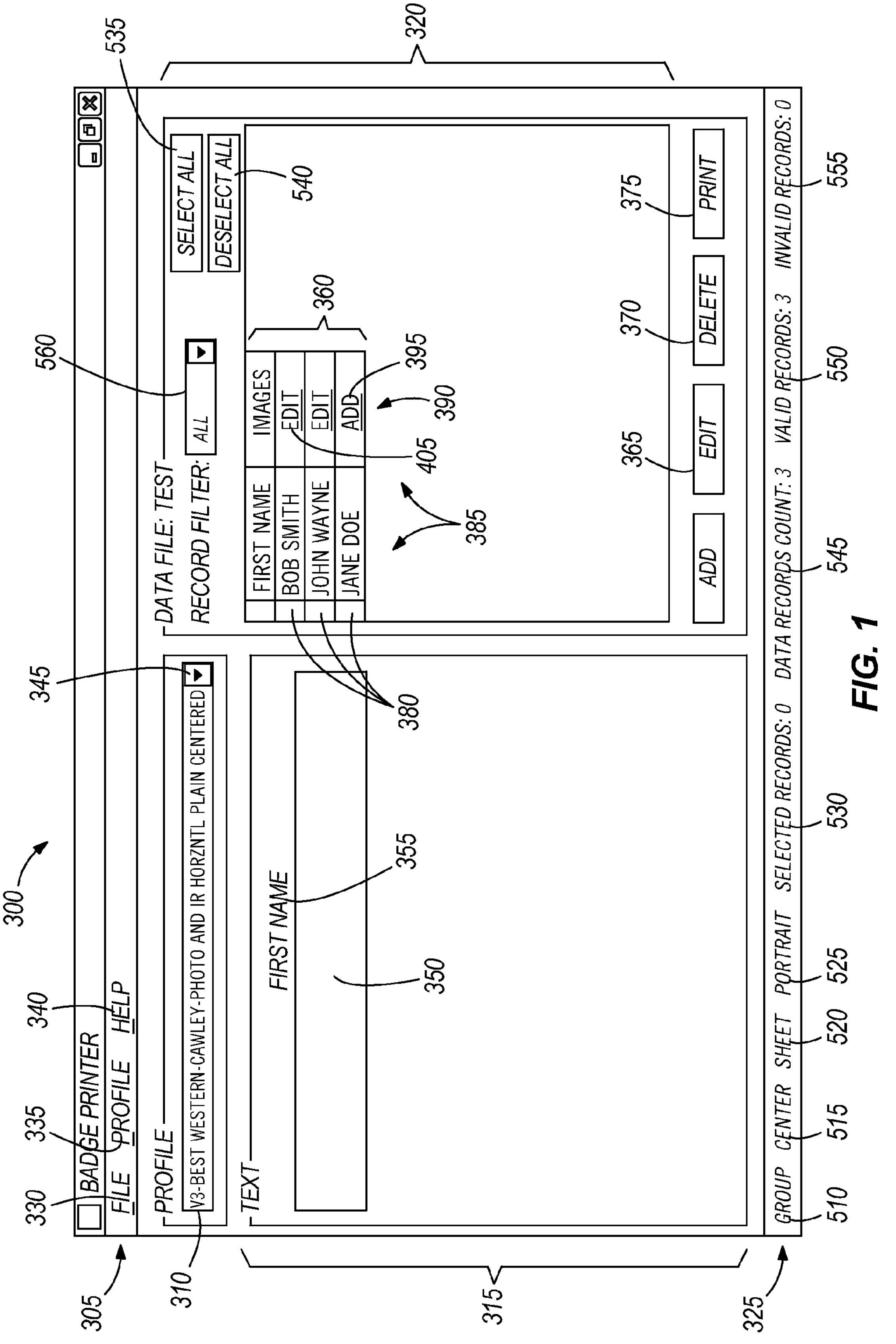
FIG. 1 is an embodiment of a main data entry screen of a computer program for creating custom badges.

As shown in FIG. 1, upon executing, the program displays a main data entry screen 300. The main data entry screen 300 includes a menu bar 305, a profile drop-down box 310, a text section 315, a data section 320, and a status bar 325. The menu bar 305 includes a file menu 330, a profile menu 335, and a help menu 340. The file menu 330 includes commands for creating and opening data files (i.e., files of custom badges for a single profile), system manager functions, printing, and exiting the program. The system manager functions include merging, importing, and exporting of data files, and printer set up functions as described below. The profile menu 335 allows profiles to be added to and removed from the program. The help menu 340 provides access to help functions.

The user selects the profile to use in creating badges from the profile drop-down box 310. Clicking an arrow icon 345 opens the profile drop-down box 310 showing a list of loaded profiles. The user clicks on the desired profile to select that profile and use it in creating badges. The chosen profile is then displayed in the profile drop-down box 310, and the text and data sections 315 and 320 are configured based on the chosen profile. When the user opens a data file, via the open command under the file menu 330, the profile associated with the data file is automatically selected, displaying the profile in the profile drop-down box 310 and configuring the text and data sections 315 and 320.

The profiles are provided to define the selected print layout, i.e., how the badge is to be printed (e.g. number of lines, font selection, etc.). In this embodiment, profiles can range from one to four lines of text. The layout of the lines, size of the lettering, type style, etc. can all vary between profiles. The profiles control the printer, directing what and how the text (data) that has been entered is printed on the badges. Only one profile may be selected (active) at any particular time, to define the badges being worked on. If there is a need to add additional profiles or to remove unwanted profiles from the selection, it can be done by making an appropriate selection under the profiles menu 335. For example, suppose that the user selects profiles for both a 2-line layout and a 3-line layout to print 8 badges with 2 lines and 4 badges with 3 lines. First, the user chooses the 2-line profile for this example. Next, the user enters the text for each of the 8 badges and prints these badges. Then, the user saves this text to a file, assuming that he wants to keep it.

In the embodiment shown, the text section 315 displays one to four boxes 350 for entering text, based on the profile selected. The boxes 350 include titles 355 identifying the type of data to be entered in each box 350 (e.g., name, department, etc.). The profile also defines the content of each box 350 (e.g., the number of characters, the font, etc.).

The text section 315 is used for data entry and edit. For example, the background color may be yellow during an edit mode, light blue if the text is in an auto-reduced state, which shrinks the text to fit the badge, and red if the text is too long to fit with the current profile of a badge.

The user selects "new" from the file menu 330 in order to clear out the data list and then selects a profile from the profile list 310. The user next enters the text for the badges and prints the badges. Then, the user saves this text to a file if he wants to keep it.

In operation, when a profile is selected for use, the number of text entry boxes 350 that are active for input matches those for the profile. The text that is desired to print on a badge may be typed directly into these boxes and then added to the data list. The widths of the text boxes 350 represent the area that is available for typed characters on the badge.

With a selection of an auto reduction profile, the type size is automatically reduced to the next lower size when the typed data exceeds that which will fit on the badge. The background color of the text entry boxes 350 changes to light blue to indicate that the text is in a reduced print size. Once the text exceeds a length that will fit with any available type size, the background color changes to red, which indicates a need to correct the text before the badge will go through the print process.

The text is verified by a function that compares the text in a data list 360 to the currently selected profile, in order to insure that the text will print correctly (fit) on the badge. This is especially useful for data that is brought into the program using an import function. If all of the data is entered manually, using the text entry as described above, verification is done on the fly ensuring valid data entries.

The text verification function runs continuously. Any items that are found not to be printable are highlighted (selected) in the data list 360 (e.g., by a red background) and can be corrected one at a time, ignored, or exported to a separate data file to be worked on at a later time.

In order to correct unprintable items one at a time, the user clicks on an edit button 365, which automatically brings forward the last bad record to be edited. Any item displayed in the data list may be edited one item at a time. First, the user clicks on the edit button 365, and the item is removed from the data list and placed in the text entry boxes 350, where it may be worked on. The background color of the boxes is yellow to indicate that it is in the edit mode, unless the program is in a reduced print level mode, which would have a blue background, or the text is too long to fit, which has a red background. The screen selections in the edit mode include saving changes or canceling the edit.

Clicking a delete button 370 deletes the items that are selected (highlighted) in the data list 360. Any item on the data list 360 may be printed by first selecting the item(s) to be printed and then clicking on a print button 375.

Figure 2:
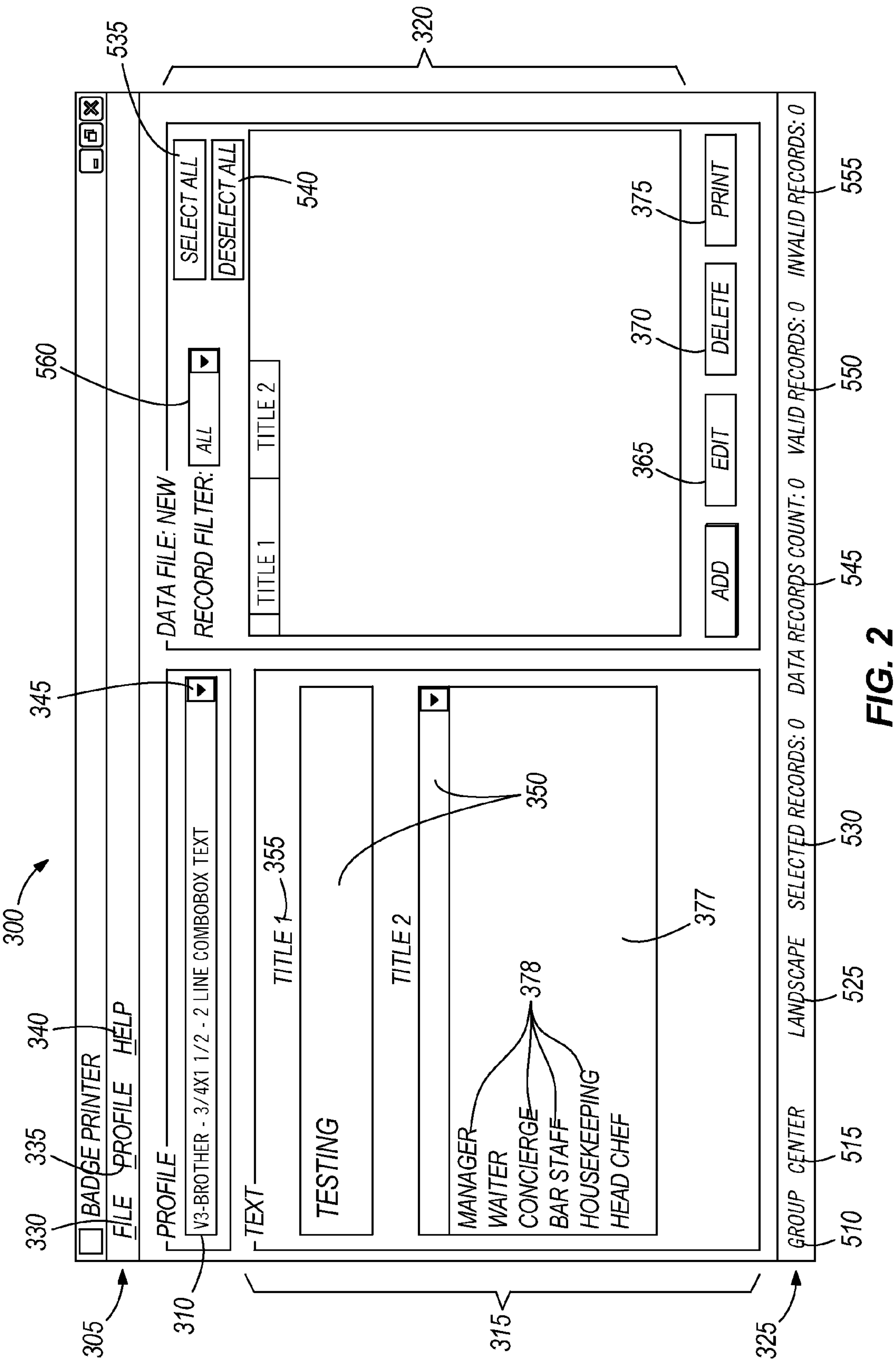
FIG. 2 is an embodiment of a main data entry screen of a computer program for creating custom badges showing a drop-down text box.

In addition, the profile can instruct the program to use data from a list file for one or more of the text boxes 350. As shown in FIG. 2, when a text box 350 is configured to use data from a list file, the box 350 displays a drop-down box 377 allowing the user to select a field 378 from the list file. For example, a text box 350 for entering a department of a badge holder can have a list file listing the departments of a company. The user enters a badge holder's name in one text box 350 and selects the badge holder's department from the drop-down box 377 in another text box 350. In some embodiments, the user is able to type in data instead of choosing from the fields 378 of the drop-down box 377 (e.g., for a department not listed in the drop-down box). In some embodiments, the drop-down box 377 enables a user to select a graphic in place of text.

Figure 3:
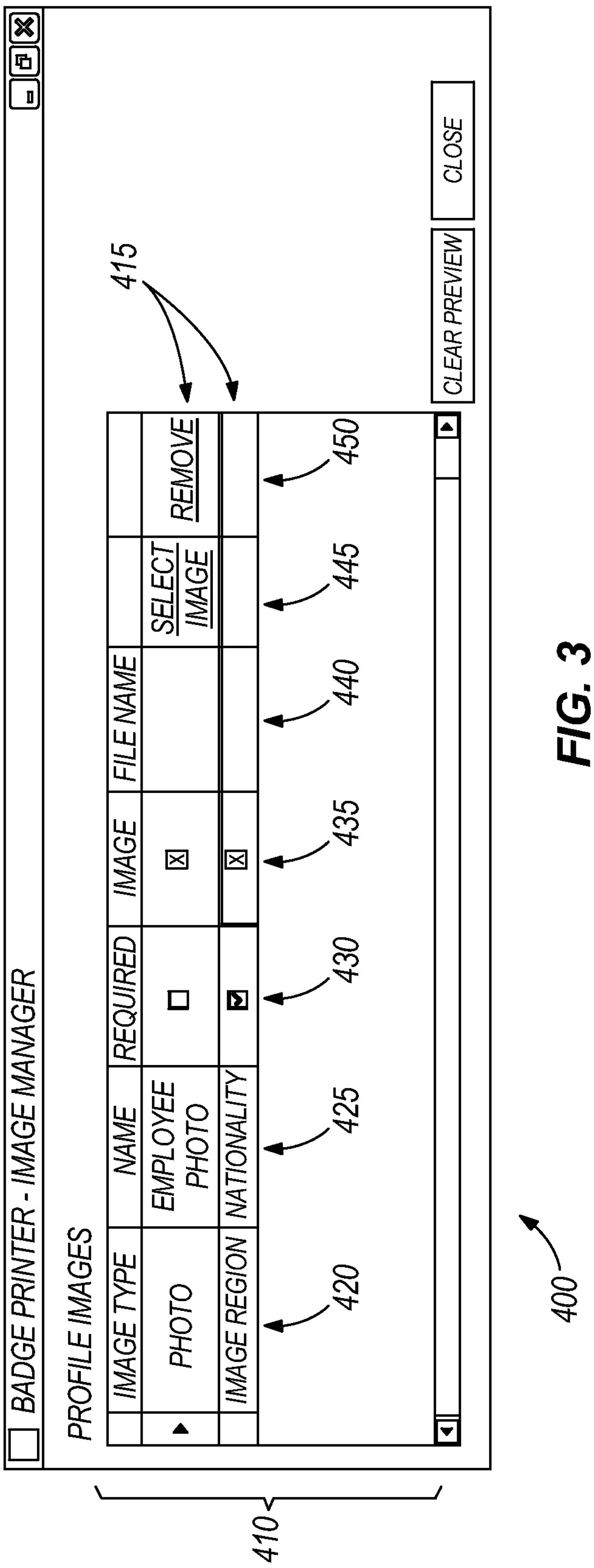
FIG. 3 is an embodiment of an image entry screen for a computer program for creating custom badges.

Data that has been entered via the text section 315 is displayed in the data section 320. A row 380 is displayed for each badge entered. Columns 385 are displayed reflecting the lines of text as defined by the profile. In addition, a profile can include an image section for the badges. When an image section is defined by the profile, an image column 390 is displayed. The user then clicks on an "Add" hyperlink 395 in the image column 390 to access an image entry screen 400 (FIG. 3). If an image was previously created for a badge, an "Edit" hyperlink 405 replaces the "Add" hyperlink 395 and allows the user to access the image entry screen 400, and modify the image fields of the badge.

Figure 4:
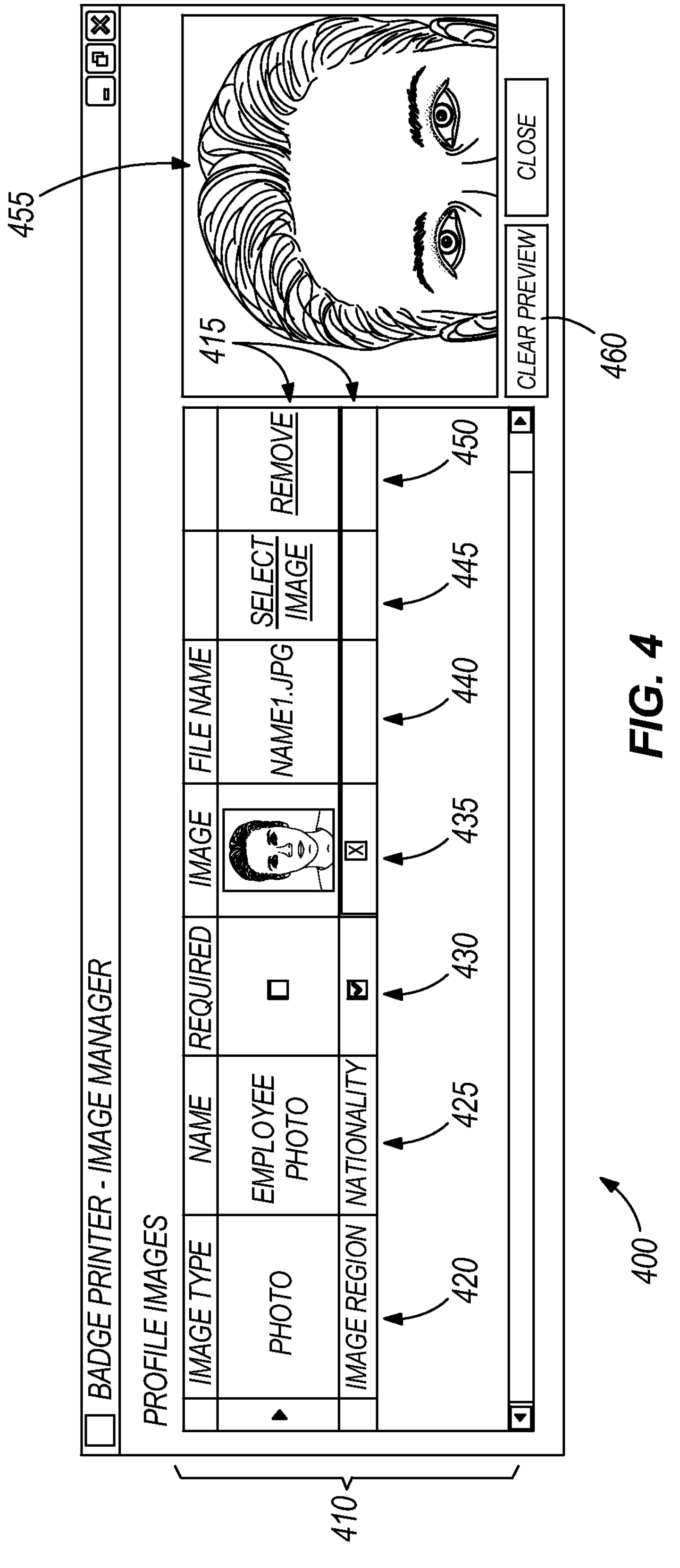
FIG. 4 shows data entered in the image entry screen of FIG. 3.

With reference also to FIGS. 3 and 4, the image entry screen 400 displays a profile image section 410 which includes one or more rows 415 of data. The type, quantity, and order of the data rows are defined by the profile. In the embodiment shown, three types of image data can be defined—image, photo, and image region. The image data is a fixed image that is printed on every badge (e.g., a company logo). The image data is defined by the profile. The photo data allows an image, generally a photo of the badge holder, to be assigned to an individual badge. The image region data allows one or more images (e.g., flags representing languages spoken by the badge holder or symbols representing the badge holder's years of service) to be selected for printing on the badge.

For each of the data rows 415 there are seven columns—image type, name, required, image, file name, image selection, and image removal. When a row 415 is for photo data, all seven columns are populated. When a row 415 is for image region data, the image type, name, and required columns are populated. When a row 415 is for image data, the image type, name, and image columns are populated.

An image type column 420 identifies the image type (i.e., image, photo, or image region) for the row. A name column 425 identifies the type of image to be selected (e.g., employee photo). A required column 430 shows whether the image type is required for every badge or not. An image column 435 displays a thumbnail image of an image selected for a photo or image row. A file name column 440 displays the name of a file containing the selected image. A selected image column 445 and a remove image column 450 contain hyperlinks for selecting the image file or removing the image from the row. The profile populates the image type column 420, the name column 425, and the required column 430, and a user cannot modify these data in these columns.

Next to the profile image section 410 is a preview section 455. Clicking on a row 415 displays a preview of the image for that row 415 in the preview section 455. A clear button 460 removes the image from the preview section 455.

Figure 5:
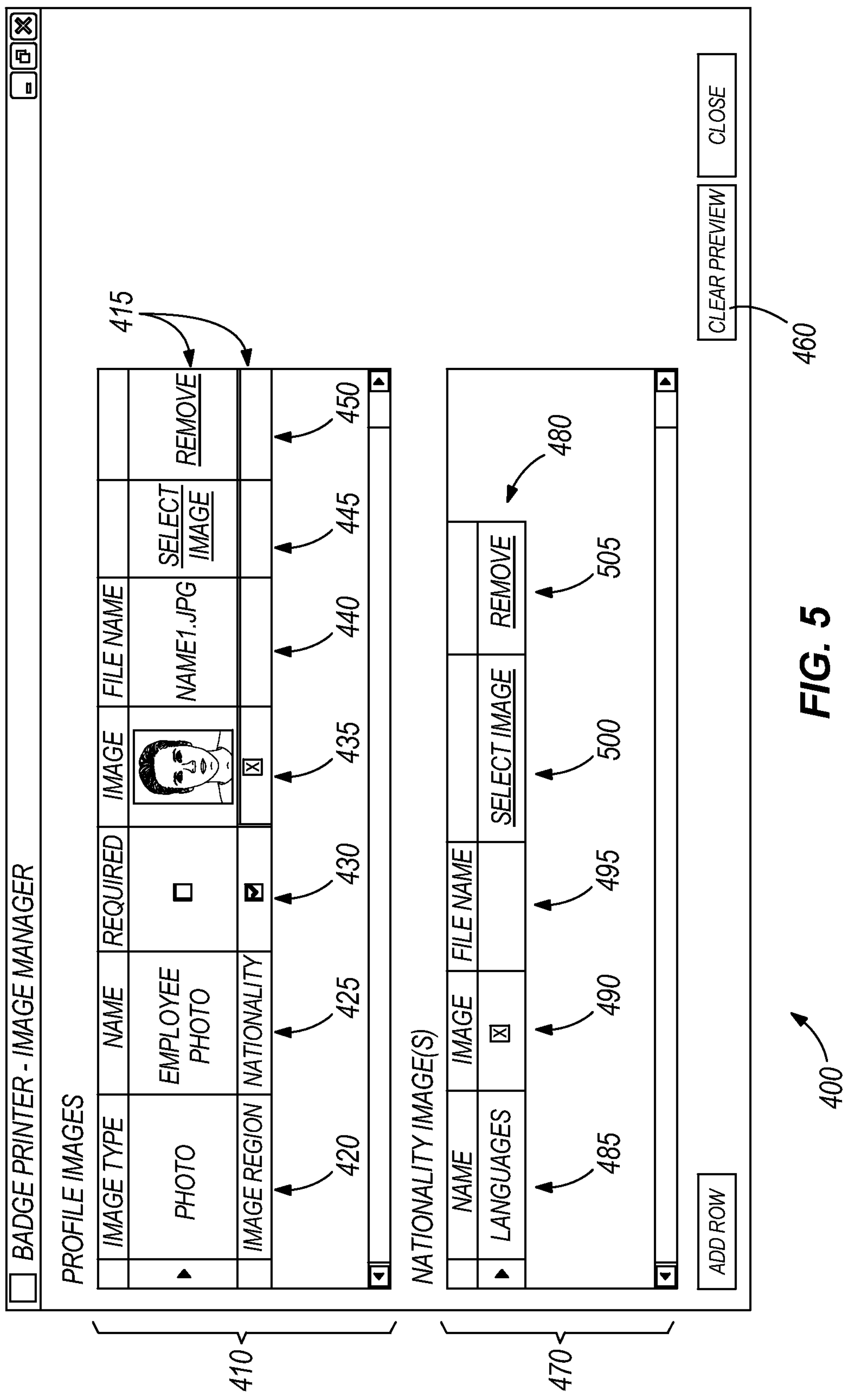
FIG. 5 is an embodiment of the image entry screen of FIG. 3 showing an embodiment of an image region section.
Figure 6:
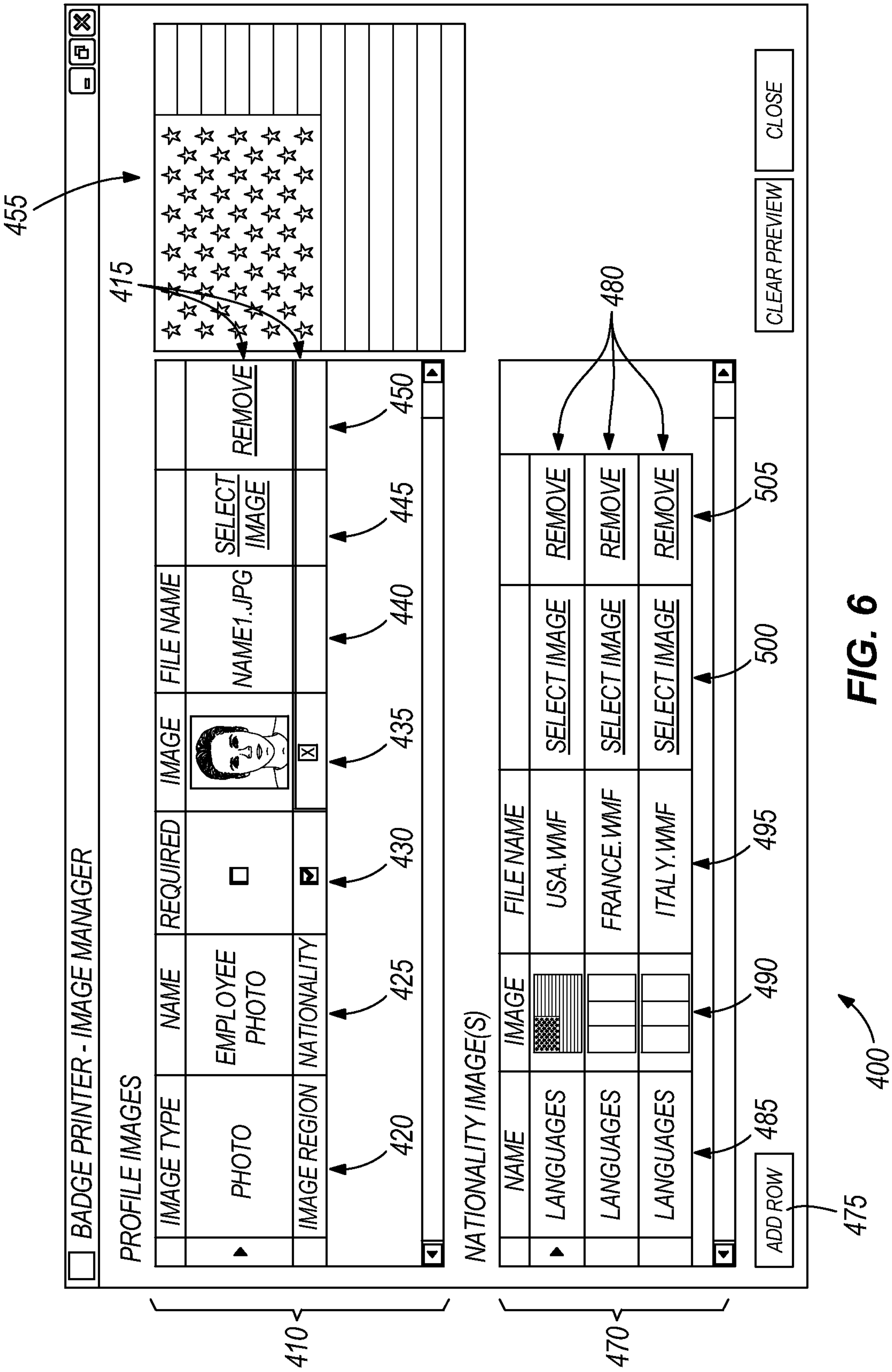
FIG. 6 shows data entered in the image region section of the image entry screen of FIG. 5.

Clicking on an image region row opens an image region section 470 (FIGS. 5 and 6). The image region section 470 allows a user to enter image region images. Clicking an add row button 475 adds an additional image region row 480. The profile defines the maximum number of image region rows 480 that can be created. Each image region row 480 has five columns—name 485, image 490, file name 495, image selection 500, and image removal 505. The name column 485 identifies the type of image to be selected (e.g., employee photo). The image column 490 displays a thumbnail image of an image selected for a photo or image region row 480. The file name column 495 displays the name of a file containing the selected image. The selected image column 500 and the remove image column 505 contain hyperlinks for selecting the image file or removing the image from the image region row 480. The profile populates the name column 485, and a user cannot modify the data in this column. Clicking on an image region row 480 displays a preview of the image for that row 480 in the preview section 455.

The image region data allows badges to be created with multiple images. For example, an image region for languages spoken can display one or more flags indicating the languages spoken by the badge holder.

The status bar 325 (FIG. 1) provides information about badges based on the profile as well as information on the data (i.e., badges) entered. A first status item 510 shows a line reduction method defined by the profile. In some embodiments, the line reduction methods include group, individual, mixed, and off. The group line reduction method reduces all lines of a badge when one line is reduced. The individual line reduction method reduces only the line(s) that needs reducing. The mixed line reduction method reduces the line that needs reducing and all subsequent lines on the badge, leaving lines prior to the reduced line at normal size. The off line reduction method does not reduce any lines, instead truncating any information that does not fit in a line's defined area.

A second status item 515 shows a text alignment selection, again defined by the profile. Text alignment can be left justified, right justified, or centered. A third status item 520 shows whether badges will be printed on a sheet (i.e., multiple badges per page) or individually. A fourth status item 525 shows whether the sheet is to be printed in landscape or portrait mode. A fifth status item 530 shows the number of records in the data list 360 that are selected. Multiple records can be selected (using standard Windows® commands—control-click for individual records, shift-click for a group of records) for printing. A select all button 535 allows all of the records to be selected for printing, and a deselect all button 540 allows all of the records to be deselected, allowing editing of the records. A sixth status item 545 shows the total number of records entered. A seventh status item 550 shows the number of entered records that are valid (i.e., the number of records with no errors). An eighth status item 555 shows the number of records that have errors (i.e., too many characters to fit on the badge). A filter drop-down box 560 allows data in the data section 320 to be filtered, showing all entered records, only valid records, or only invalid records.

An import function allows the user to bring in data that was entered in a different program; perhaps a picture produced by a digital camera. The file that is used for importing must be formatted as described in the section below. If the data window is not already empty, a prompt indicates the need to save any changes before importing data because it brings the data onto a clean screen.

In some embodiments, the data preferably is imported in a text file (also called an ASCII file) that has the correct number of fields based on the profile, with each field separated by a comma. This is commonly called a CSV (comma delimited) file and is often found in export options for database programs. The data may be trimmed down to four fields or less by using a spreadsheet program, such as Excel®.

Saving a data set saves the list of items displayed in the data window and the name of the profile that was used when the data was created. This information may be written to a disk of the user's choice. Later, a saved item may be brought back by using the "Open" menu selection. More particularly, a data set that was previously saved and then opened includes the profile that was used when this data set was saved. If that profile is no longer installed in the program, a warning is given to indicate that a new profile must be selected for use with this opened data set.

An export protocol allows the user to select one or more items in the data window and then to move them to a CSV (comma delimited) data file. This feature could be most useful when a large group of items are printed, and there is a notification that several items did not print because they did not fit the existing profile. These items will be highlighted (selected) so that they may be exported to a separate data file in order to resolve any problems at a later time (most likely either by shortening the text or using a different profile).

A merge function merges the data displayed in the data window into an existing data file.

If "New" is selected from the file menu 330, the screen is cleared to prepare for entry of a new set of data. A prompt reminds the user to save any changes that may have been made to the data list before it is cleared out.

Figure 7:
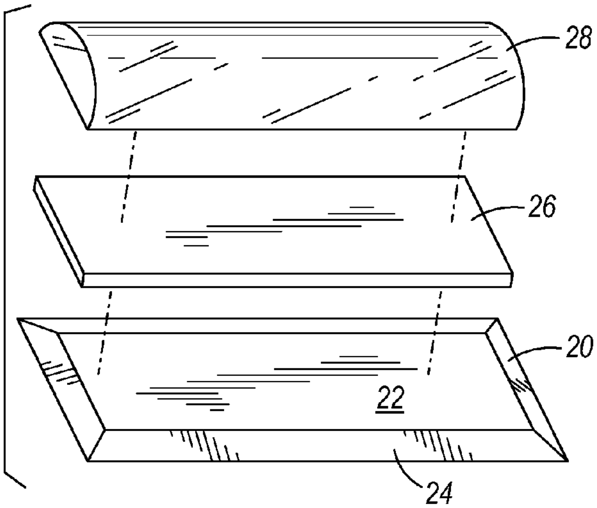
FIG. 7 is an exploded view of the inventive badge.
Figure 8:
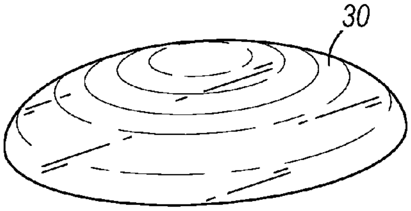
FIG. 8 is a plastic cover having an alternative shape and surface contour.
Figure 9:
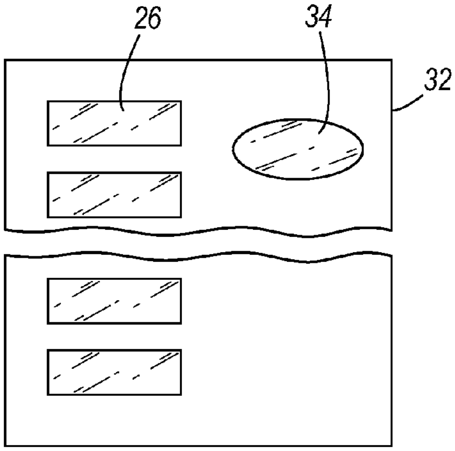
FIG. 9 is a sheet of release paper or material with adhesive labels or nameplates thereon.

FIGS. 7-9 illustrate the various parts that may be used for badges of this invention.

FIG. 7 shows a polished metal backing plate 20, constructed, e.g., as taught in FIG. 7 of U.S. Pat. No. 4,459,772. Preferably, the plate 20 has a flat surface 22 surrounded by beveled edges 24. The overall appearance of the backing plate 20 has the elegance of fine jewelry. Plastic-backing plates may also be used, especially with some of the modern plastics, which have an elegant or artistic appearance.

The label stock or name plate 26 (FIGS. 7 and 9) is preferably an adhesive paper or polyvinyl plate, which may be laminated, have a treated surface, or the like, and a pressure-sensitive adhesive on the back surface thereof so that it may be peeled off a release paper or other release material 32 and stuck onto area 22 of the backing plate 20. The front of item 26 may be coated or laminated to provide a surface for receiving any suitable printer ink, such as applied by either an ink jet or a laser printer.

Item 26 may be provided with a preprinted background; or, it may be plain and in a condition to receive original graphics or text applied under the control of a personal computer, a picture taken by a digital camera, or the like. For example, an advertising department of a large hotel chain may select an appropriate logo or background graphics for display on name badges for its employees. A computer and printer may print names and titles of individuals over the background graphics. In an example of an art studio, a craft shop, or the like, perhaps there may be many different creative designs selected to advertise their artistry. Digital pictures may also be applied to the label stock 26. Sometimes the graphics may be uniquely designed by the individual wearing the badge. In any event, a greater variety of text and graphics are made available by a use of a personal computer and its printer.

Item or lens 28 is a plastic (such as epoxy, a mixture of urethanes, or the like) lens which also has a pressure-sensitive adhesive on the flat underside thereof. Lens 28 may be dome-shaped, as shown, and the plastic material should be sufficiently clear so that the graphics may be clearly seen through the lens. The lens 28 may also provide special effects (such as pearlescence) as long as it does not conceal the graphics. For example, item 28 may be pastel amber, blue, green or the like. The plastic material used for the lens 28 should be strong enough to resist breaking, hard enough to resist scratches, and should not discolor over time. A release paper may be peeled off the back and the plastic lens 28 may be stuck over the label 26 after the label is in place on backing plate 20.

The items in FIG. 7 are shown as rectangular members for convenience of description. The lens 28 is shown as having an upper, somewhat rounded surface contour. However, these configurations can vary. By way of an example of any other suitable shapes, FIG. 8 shows an oval lens 30, which is also transparent. This lens 30 has a gentle continuously curved dome, reminiscent of a cabochon. Usually, lens 30 will fit on an oval backing plate constructed similar to the construction of backing plate 20, again, as taught in FIG. 7 of U.S. Pat. No. 4,459,772. Or, a plastic backing plate may be used.

FIG. 9 shows a sheet of release paper 32 with labels 26 thereon, which may have any convenient form. Each label 26 has pressure-sensitive adhesive on the back thereof. As here shown, label 26 is rectangular to match the shape of plate 20 in FIG. 7. Label 34 is oval to fit under the lens 30 of FIG. 8. Of course, other suitable shapes may be employed. The labels 26 may be clear and capable of adhering to the underside of item 28, and the combination may then be applied to plate 20.

The sheet 32 is designed to feed through almost any of the printers used with modern personal computers, such as ink jet, laser or digital card printers. After the labels in FIG. 9 are printed, they may be peeled off and attached to a backing plate, such as backing plate 20, for example, or to a clear lens 28 or the like.

Figure 10:
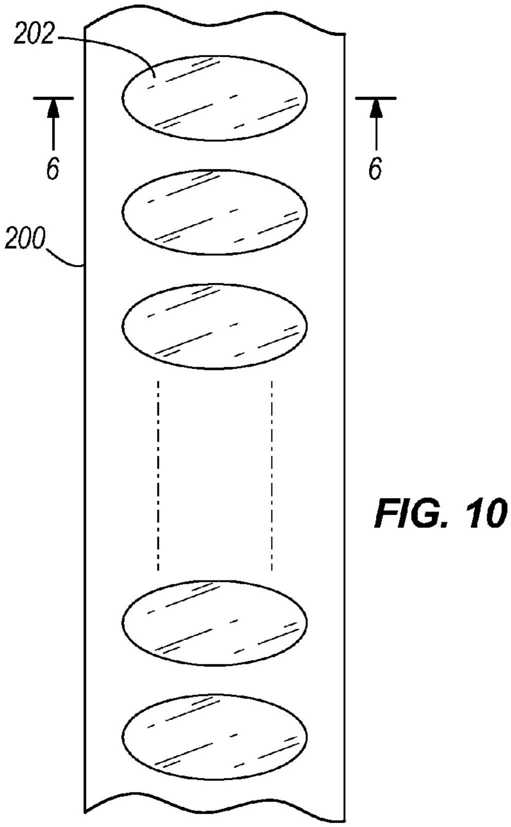
FIG. 10 is a plan view of a plurality of preformed plastic domes, each with a pressure sensitive adhesive, mounted on a release paper.

As shown in FIG. 10, any suitable release paper 200 preferably has a plurality of preformed transparent molded plastic domes 202 mounted thereon. The showing of a plurality of domes assumes that the badges are made for or by a relatively large organization such as a manufacturer, business, church, school, or the like, where many badges will be produced. If the badges are made for use by a smaller organization—or an individual—a smaller release paper may be provided with fewer plastic domes. Or, for an individual, there may be a single dome on each piece of release paper.

The dome is made beginning with an optically clear, substantially 5-mil polyester film laminated to a super clear adhesive that virtually eliminates any bubbles that might appear. Also, the film may be coated by laminating it to a polyester liner. Then, this clear polyester film is coated with a high-grade, optically clear plastic mixture that enhances both visually and tactilely by adding dimension, as well as a continuous "look" to products designed with a graphic display. Printed graphics can be specified in multiple colors and bright metallic ink.

Figure 11:
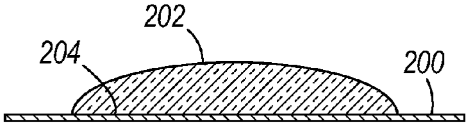
FIG. 11 is a cross sectional view taken along line 6-6 of FIG. 10.

FIG. 11 shows in cross section an exemplary transparent dome 202 mounted on release paper 200, a heavily inked line 204 identifies pressure sensitive adhesive on the bottom surface of the dome. Dome 202 may be peeled off the release paper 200 and stuck on a suitable surface.

Figure 12:
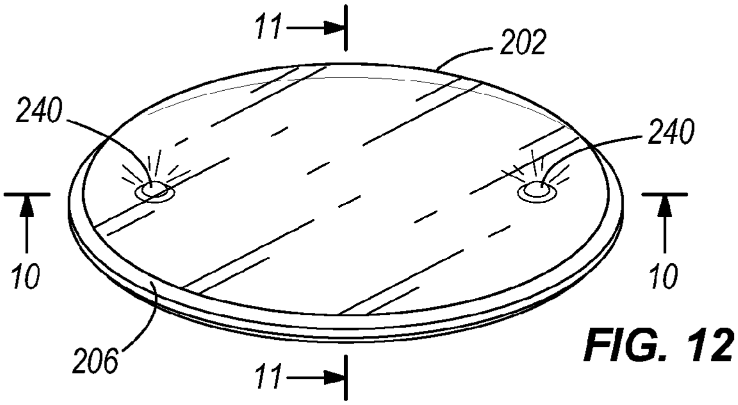
FIG. 12 is a perspective view of a badge with a symmetrical plastic dome of FIG. 10.

FIG. 12 is a perspective view of the dome 202 mounted on a front plate 206 which may be metal or plastic. For novelty badges, one or more LED's or LCD's may be positioned under the dome, as indicated at 240. The dome is here shown as an oval with a smooth surface. However, the dome may also take any suitable shape, either smooth or in bas-relief.

Figure 13:
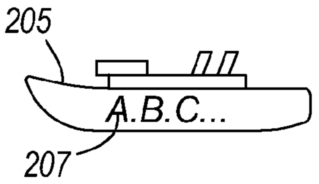
FIGS. 13 and 14 respectively show similar plastic domes, but with bas-relief and a non-symmetrical outline, here a cruise ship and a cartoon of a bird, by way of example.
Figure 14:
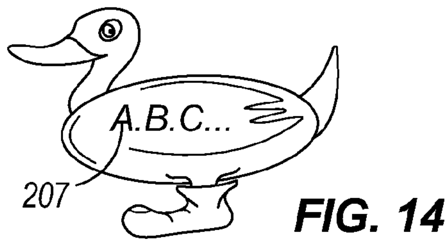

It may also be a specialty designed item, including odd shapes such as a silhouette of a cruise ship (FIG. 13), a cartoon character (FIG. 14), or the like. In greater detail, FIG. 13 shows a plastic dome in the form of a ship where the hull 205 is a smooth surface so that the graphics 207 are clearly seen without optical distortion. The above deck cabin, bridge and funnels may be in bas-relief. In FIG. 14, the plastic dome is in the form of a cartoon bird, such as a duck, by way of example. The graphics 207 are viewed through a smooth body or wing surface so that there is no optical distortion. However, the bird's eye, bill, shoe and lower edge of the wing may be in bas-relief.

If the shape is one which is difficult to align, an upstanding fence may be provided. Or, when this alignment is less complicated, the front plate may be smooth. The point is that optional arrangements may be provided to accommodate the needs of a badge maker, which is particularly attractive for a do-it-yourselfer.

Figure 15:
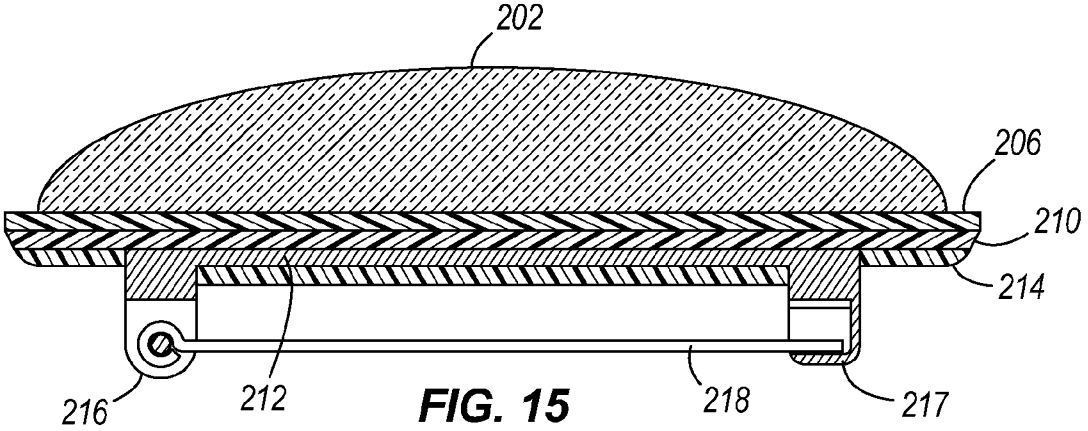
FIG. 15 is a longitudinal cross section taken along line 10-10 of FIG. 12.
Figure 16:
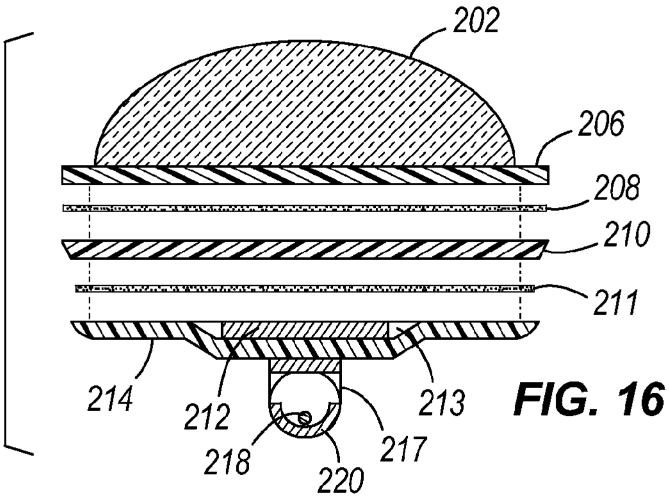
FIG. 16 is an exploded cross-sectional view taken along line 11-11 of FIG. 12.

FIGS. 15 and 16 show the dome 202 adhered to the layer 206. A suitable adhesive 208 secures the layer 206 to a front plate 210. Adhesive 211 secures a back plate 214 to front plate 210. Any suitable finding, such as pin back 212, is trapped in a space provided by an off-set area 213 between front plate 210 and back plate 214. Any other suitable finding may be used in place of pin back 212.

As here shown, the back plate 214 has two holes which receive and pass posts, such as 216, 217 (FIGS. 15, 18) on the pin back 212. A pin 218 extends between the posts 216, 217 in order to provide a means for attaching the badge to a garment or the like. A safety catch 220 (FIG. 16) rotates to capture or release the pin 218.

After the parts shown in exploded view FIG. 16 are pressed together and secured in position by the adhesive 208, 211, the assembly is a compact unit, as seen in FIG. 15.

The embodiment of FIGS. 10-16 is directed to a dome of plastic used on and in connection with a smooth front plate 206.

Figure 17:
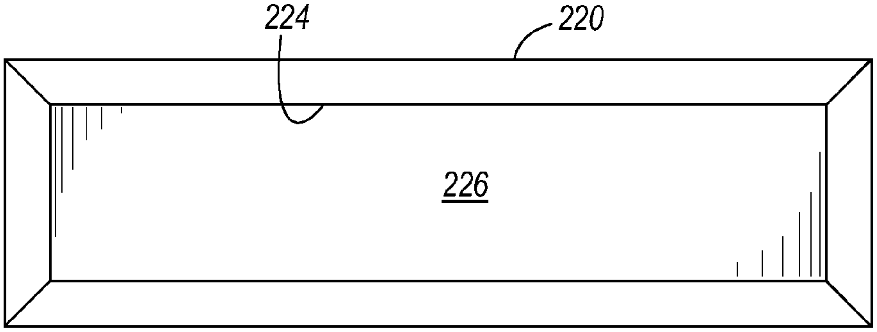
FIG. 17 is a plan view of a front plate with a fence or frame for aligning the graphics and a plastic dome.
Figure 18:
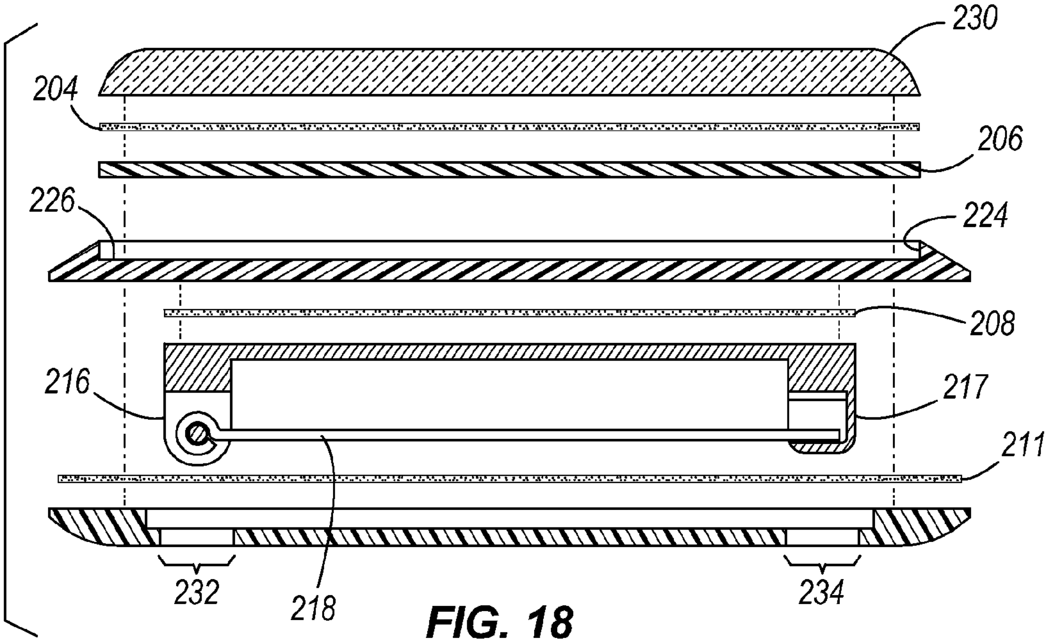
FIG. 18 is an exploded side view of a badge using the front plate of FIG. 17.

FIGS. 17, 18 show a use of a transparent dome with a back plate 220 which has an upstanding fence 224, thereon, that surrounds an open topped area 226 which receives both graphics plate or layer 206 and the transparent plastic dome 230. When a plastic dome is used the fence is preferably relatively low so that the dome extends well above the fence; although the relationship between the fence and the dome may be selected to give an appearance of a cabochon set in a finding.

The exploded view (FIG. 18) shows a plastic dome 230 and layer 206, both of which are shaped to fit into the fenced space 226. They are guided and directed into place by abutting against the fence 224. The posts 216, 217 on pin back 212 fit through holes 232, 234 in the back plate 212. The posts are held in place by the adhesives 204, 208, and 211.

Figure 19:
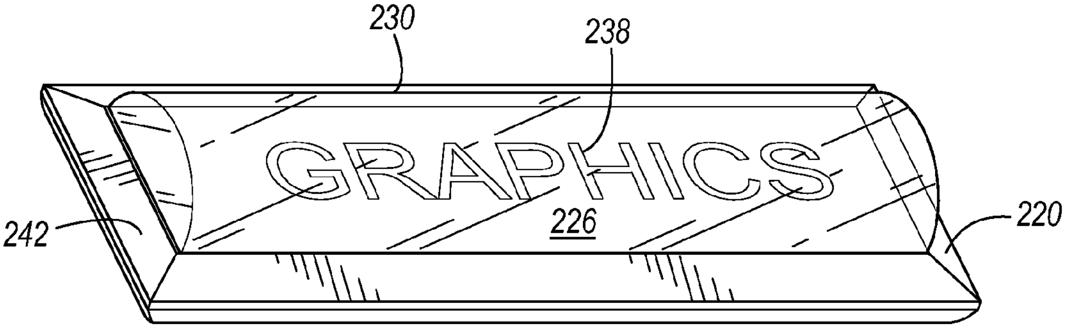
FIG. 19 is a perspective view of the badge of FIG. 18 in an assembled state.

FIG. 19 shows the finished product where the plastic dome 230 is in place within the fenced area 226 on front plate 220. The graphics 238 are seen through the transparent dome 230. Preferably, the surface 242 is polished with a golden or silver appearance so that dome 230 suggests a cabochon set in a jewelry-like finding.

The invention is adaptable for sale in kit form. The specifics of the kit will, of course, depend upon the customers' wants and needs. However, in general, the kit includes at least one plastic lens, which may be dome-shaped or pillow-shaped, mounted on a release paper, a front plate, a back plate, and a finding. If the badge is one which is symmetrical and relatively easy to align, the front plate is usually planar. If it is one which is difficult to align, the front plate usually includes a fence.

Those who are skilled in the art will readily perceive modifications which are within the spirit and scope of the invention. Therefore, the appended claims are to be construed to cover all equivalent structures.

What is claimed is:

1. A system for generating customized badges, the system comprising:

a computer;

a printer coupled to the computer; a display coupled to the computer; and a software program stored on a non-transitory computer readable medium accessible by the computer, the software program including instructions for opening a badge profile, the badge profile defining a size, type, and location of data to be primed on the customized badges, providing a data entry screen based on the profile, receiving data in the data entry screen, selecting an auto reduction profile to reduce automatically the size of all data to the next lower size when the data exceeds an available space on the profile, the data entry screen changes color to inform a user that the quantity of data exceeds a quantity defined by the badge profile, the color changes to a second color to indicate that the quantity of data is reduced in size to fit on the badge, the color changes to a third color to indicate that the quantity of data does not fit on the badge; and printing customized badges on the primer based on the received data.

2. The system of claim 1, wherein the badge profile is chosen from a drop-down box on the data entry screen.

3. The system of claim 1, further comprising displaying a drop down box on the data entry screen for selection of data from a list file.

4. The system of claim 1, further comprising providing a second data entry screen for selecting images to be printed on the customized badges.

5. The system of claim 1, wherein the badge profile defines at least one image area including at least one of an image, a photo, and an image region.

6. The system of claim 5, wherein the badge profile defines whether the at least one image area is required for each of the customized badges.

7. The system of claim 1, wherein the image is the same for all of the customized badges.

8. The system of claim 1, wherein a badge has one or more image regions, the quantity of image regions determined by the individual badge holder up to a maximum quantity defined by the badge profile.

9. The system of claim 1, wherein the badge profile defines the operation of each line of text based on one of group, individual, mixed, and off, wherein all lines perform identical functions in group operation, all lines function individually in individual operation, all lines following a reduced line are also reduced in mixed operation, and none of the line are reduced in off operation.

10. A method of generating customized badges using a computer, display, and printer, the method comprising:

providing to the computer one or more profiles on a software program stored on a non-transitory computer readable medium accessible by the computer;

loading one of the one or more profiles, the loaded profile defining a size, type, and location of data to be printed on the customized badges;

generating a data entry screen on the display based on the loaded profile, the data entry screen including one or more text fields for entering textual data;

receiving textual data in the one or more text fields; indicating on the display when the textual data fails to fit within the loaded profile;

selecting an auto reduction profile to reduce automatically the size of all data to the next lower size when the data exceeds an available space on the profile wherein the data entry screen changes color to inform a user that the quantity of data exceeds a quantity defined by the badge profile, the color changes to a second color to indicate that the quantity of data is reduced in size to fit on the badge, the color changes to a third color to indicate that the quantity of data does not fit on the badge;

formatting, by the computer, the data based on the loaded profile; and printing the formatted data on the printer.

11. The method of claim 10, further comprising providing access to an image entry screen, receiving an image selection, loading an image based on the image selection, and wherein the formatted data includes the image.

12. The method of claim 11, wherein the image is at least one of a photo and an image region.

13. The method of claim 11, further comprising displaying a thumbnail image of each chosen image in the image entry screen.

14. The method of claim 11, further comprising displaying a chosen image in a preview section of the image entry screen.

15. The method of claim 10, wherein at least one of the one or more text fields includes a drop-down box, the drop-down box providing access to a plurality of text data in a list file, wherein one of the plurality of text data is chosen from the drop-down box.

16. The method of claim 10, wherein the loaded profile defines an image to be printed on all of the customized badges.

17. The method of claim 10, wherein the loaded profile defines the operation of the text fields based on one of group, individual, mixed, and off, wherein all lines perform identical functions in group operation, all lines function individually in individual operation, all lines following a reduced line are also reduced in mixed operation, and none of the line are reduced in off operation.

18. A system for generating customized badges, the system comprising:

a computer;

a printer coupled to the computer;

a display coupled to the computer;

a software program stored on a non-transitory computer readable medium accessible by the computer, the software program including instructions for opening a badge profile, the badge profile defining a size, type, and location of data to be printed on the customized badges, providing a data entry screen based on the profile, receiving data in the data entry screen, and printing customized badges on the printer based on the received data, wherein the badge profile defines an automatic group line reduction method that reduces all lines of data in the badge when one line is reduced, when the data exceeds an available space on the profile, and the data entry screen changes color to inform a user that the quantity of data exceeds a quantity defined by the badge profile, the color changes to a second color to indicate that the quantity of data is reduced in size to fit on the badge, and the color changes to a third color to indicate that the quantity of data does not fit on the badge.

19. The system of claim 18, wherein the badge profile further defines automatic individual, automatic mixed, and automatic off line reduction methods, wherein the individual reduction method reduces only the lines that need reduction, the mixed line reduction method reduces all lines following a reduced line, and the off line reduction method does not reduce any lines.

20. The system of claim 18, wherein the badge profile defines at least one image area including at least one of an image, a photo, and an image region.

21. The system of claim 20, wherein the image region can include multiple images.

* * * * *